US012752639B2

(12) United States Patent
Ugare et al.

(10) Patent No.: US 12,752,639 B2
(45) Date of Patent: Oct. 6, 2026

(54) SYSTEMS FOR AUXILIARY BATTERY FOR INVERTER FOR ELECTRIC VEHICLE

(71) Applicant: BorgWarner Inc., Auburn Hills, MI (US)

(72) Inventors: Chetan Ugare, Nuremberg (DE); Andreas Apelsmeier, Pollenfeld (DE)

(73) Assignee: BorgWarner Inc., Auburn Hills, MI (US)

( * ) Notice: Subject to any disclaimer, the term of this patent is extended or adjusted under 35 U.S.C. 154(b) by 22 days.

(21) Appl. No.: 18/947,507

(22) Filed: Nov. 14, 2024

(65) Prior Publication Data

US 2026/0131671 A1 May 14, 2026

(51) Int. Cl.

| | |
|---|---|
| ***B60W 10/26*** | (2006.01) |
| ***B60L 50/51*** | (2019.01) |
| ***B60L 50/60*** | (2019.01) |
| ***B60L 58/16*** | (2019.01) |
| ***B60R 16/023*** | (2006.01) |
| ***B60R 16/03*** | (2006.01) |
| ***H02J 7/34*** | (2006.01) |

(52) U.S. Cl.
CPC ............... *B60L 50/60* (2019.02); *B60L 50/51* (2019.02); *B60L 58/16* (2019.02); *B60R 16/023* (2013.01); *B60R 16/03* (2013.01); *H02J 7/342* (2020.01); *B60L 2210/42* (2013.01)

(58) Field of Classification Search
CPC .. B60L 3/003; B60L 3/0061; B60L 2240/547; B60L 50/60; B60L 50/51; B60L 58/16; B60L 2210/42; B60R 16/023; B60R 16/03; H02J 7/342
See application file for complete search history.

(56) References Cited

U.S. PATENT DOCUMENTS

| | | | | |
|---|---|---|---|---|
| 2018/0154787 | A1* | 6/2018 | Chen | B60L 53/14 |
| 2020/0086762 | A1* | 3/2020 | Kirchhoffer | B60L 3/0023 |
| 2020/0194996 | A1* | 6/2020 | Fisher | H05K 7/2089 |
| 2020/0339103 | A1* | 10/2020 | Takahashi | B60L 3/04 |
| 2022/0115879 | A1* | 4/2022 | Kahn | H01M 10/4257 |
| 2024/0100992 | A1 | 3/2024 | Boddi et al. | |
| 2024/0235362 | A1* | 7/2024 | Matteson | H02J 7/865 |
| 2025/0219429 | A1* | 7/2025 | Verhagen | B60L 1/003 |
| 2026/0019009 | A1* | 1/2026 | Matteson | B60L 15/007 |

FOREIGN PATENT DOCUMENTS

| | | | |
|---|---|---|---|
| EP | 0573065 | A2 | 12/1993 |
| EP | 4108496 | A1 | 12/2022 |
| JP | 2024030248 | A | 3/2024 |

* cited by examiner

*Primary Examiner* — Dalena Tran
(74) *Attorney, Agent, or Firm* — Joshua M. Haines; Bookoff McAndrews, PLLC

(57) ABSTRACT

A system includes an inverter configured to convert DC power from a main battery to AC power to drive a motor, wherein the inverter includes a galvanic isolator separating a high voltage (HV) area from a low voltage (LV) area, a gate driver in the HV area, the gate driver to control one or more switches in the HV area in response to a control signal from the LV area, an auxiliary battery assembly in the HV area, and a power supply to provide power to the HV area from each of the main battery and the auxiliary battery assembly.

9 Claims, 5 Drawing Sheets

SYSTEMS FOR AUXILIARY BATTERY FOR INVERTER FOR ELECTRIC VEHICLE

TECHNICAL FIELD

Various embodiments of the present disclosure relate generally to systems for an inverter for an electric vehicle, and, more particularly, to systems for an auxiliary battery for an inverter for an electric vehicle.

BACKGROUND

Inverters, such as those used to drive a motor in an electric vehicle, for example, may convert High Voltage Direct Current (HVDC) into Alternating Current (AC) to drive the motor. An inverter may include an isolation between a high voltage (HV) side and a low voltage (LV) side for safety reasons. In an inverter, components arranged in the LV side may communicate to components in the HV side, which may require electrical isolation between the HV side and the LV side.

The present disclosure is directed to overcoming one or more of these above-referenced challenges.

SUMMARY OF THE DISCLOSURE

In some aspects, the techniques described herein relate to a system including an inverter configured to convert DC power from a main battery to AC power to drive a motor, wherein the inverter includes: a galvanic isolator separating a high voltage (HV) area from a low voltage (LV) area; a gate driver in the HV area, the gate driver to control one or more switches in the HV area in response to a control signal from the LV area; an auxiliary battery assembly in the HV area; and a power supply to provide power to the HV area from each of the main battery and the auxiliary battery assembly.

In some aspects, the techniques described herein relate to a system, wherein the power supply is a gate driver power supply configured to provide power to the gate driver and receive power from the main battery during normal operation of the main battery.

In some aspects, the techniques described herein relate to a system, wherein the auxiliary battery assembly includes an auxiliary battery, and the auxiliary battery assembly is configured to supply power from the auxiliary battery to circuit components arranged in the HV area in response to a failure of the main battery.

In some aspects, the techniques described herein relate to a system, wherein the auxiliary battery assembly includes an auxiliary battery, and the auxiliary battery assembly is configured to supply power from the auxiliary battery to circuit components arranged in the LV area in response to a failure of the main battery.

In some aspects, the techniques described herein relate to a system, wherein the auxiliary battery assembly is configured to supply power from the auxiliary battery to the gate driver power supply to discharge an HV bus of the inverter.

In some aspects, the techniques described herein relate to a system, wherein the auxiliary battery assembly further includes one or more of: an auxiliary battery monitoring and balancing circuit to monitor the auxiliary battery, or an auxiliary battery charging protection circuit to charge the auxiliary battery from the main battery.

In some aspects, the techniques described herein relate to a system, wherein the inverter further includes: one or more controllers arranged in the LV area, the one or more controllers configured to output the control signal.

In some aspects, the techniques described herein relate to a system, wherein the auxiliary battery assembly includes an auxiliary battery, and the auxiliary battery assembly is configured to: disconnect the auxiliary battery from the power supply when operation of the main battery is normal, and connect the auxiliary battery to the power supply in response to a failure of the main battery.

In some aspects, the techniques described herein relate to a system, further including: the main battery configured to supply the DC power to the inverter; and the motor configured to receive the AC power from the inverter to drive the motor, wherein the system is provided as a vehicle including the inverter, the main battery, and the motor.

In some aspects, the techniques described herein relate to a system including an auxiliary battery assembly for an inverter, wherein the auxiliary battery assembly is configured to be provided in a high voltage (HV) area of the inverter to provide power to a power supply from each of a main battery and an auxiliary battery, and wherein the HV area is galvanically isolated from a low voltage (LV) area of the inverter.

In some aspects, the techniques described herein relate to a system, wherein the auxiliary battery assembly includes: the auxiliary battery; a charging circuit configured to charge the auxiliary battery; and a monitoring circuit configured to monitor the auxiliary battery.

In some aspects, the techniques described herein relate to a system, wherein the power supply is a gate driver power supply configured to receive power from the auxiliary battery in response to a failure of the main battery.

In some aspects, the techniques described herein relate to a system, wherein the power supply is configured to receive power from the main battery during normal operation of the main battery, and provide power to circuit components arranged in the HV area during normal operation of the main battery, and wherein the power supply is further configured to receive power from the auxiliary battery in response to a failure of the main battery, and provide power to circuit components arranged in the HV area and the LV area during the failure of the main battery.

In some aspects, the techniques described herein relate to a system, wherein the auxiliary battery assembly is configured to provide power from the auxiliary battery to the gate driver power supply during an initialization of the inverter before the main battery is connected to the inverter.

In some aspects, the techniques described herein relate to a system, wherein the auxiliary battery assembly is configured to provide power from the auxiliary battery to the gate driver power supply during shut down of the inverter after the main battery is disconnected from the inverter.

In some aspects, the techniques described herein relate to a system, wherein the gate driver power supply is configured to provide power to a gate driver of the inverter, wherein the gate driver is configured to control one or more switches in response to receiving a control signal from one or more controllers.

In some aspects, the techniques described herein relate to a system including an auxiliary battery assembly for an inverter, the auxiliary battery assembly including: an electrical connection to a power supply in a high voltage area of the inverter, wherein the high voltage area is galvanically isolated from a low voltage area of the inverter; and an auxiliary battery connector to transfer power from an auxiliary battery in the high voltage area of the inverter to the electrical connection to the power supply.

In some aspects, the techniques described herein relate to a system, wherein the auxiliary battery assembly further includes: the auxiliary battery.

In some aspects, the techniques described herein relate to a system, wherein the auxiliary battery assembly further includes: a charging circuit to charge the auxiliary battery from one or more of a main battery or an external power supply.

In some aspects, the techniques described herein relate to a system, wherein the auxiliary battery assembly further includes: a monitoring circuit to monitor the auxiliary battery.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
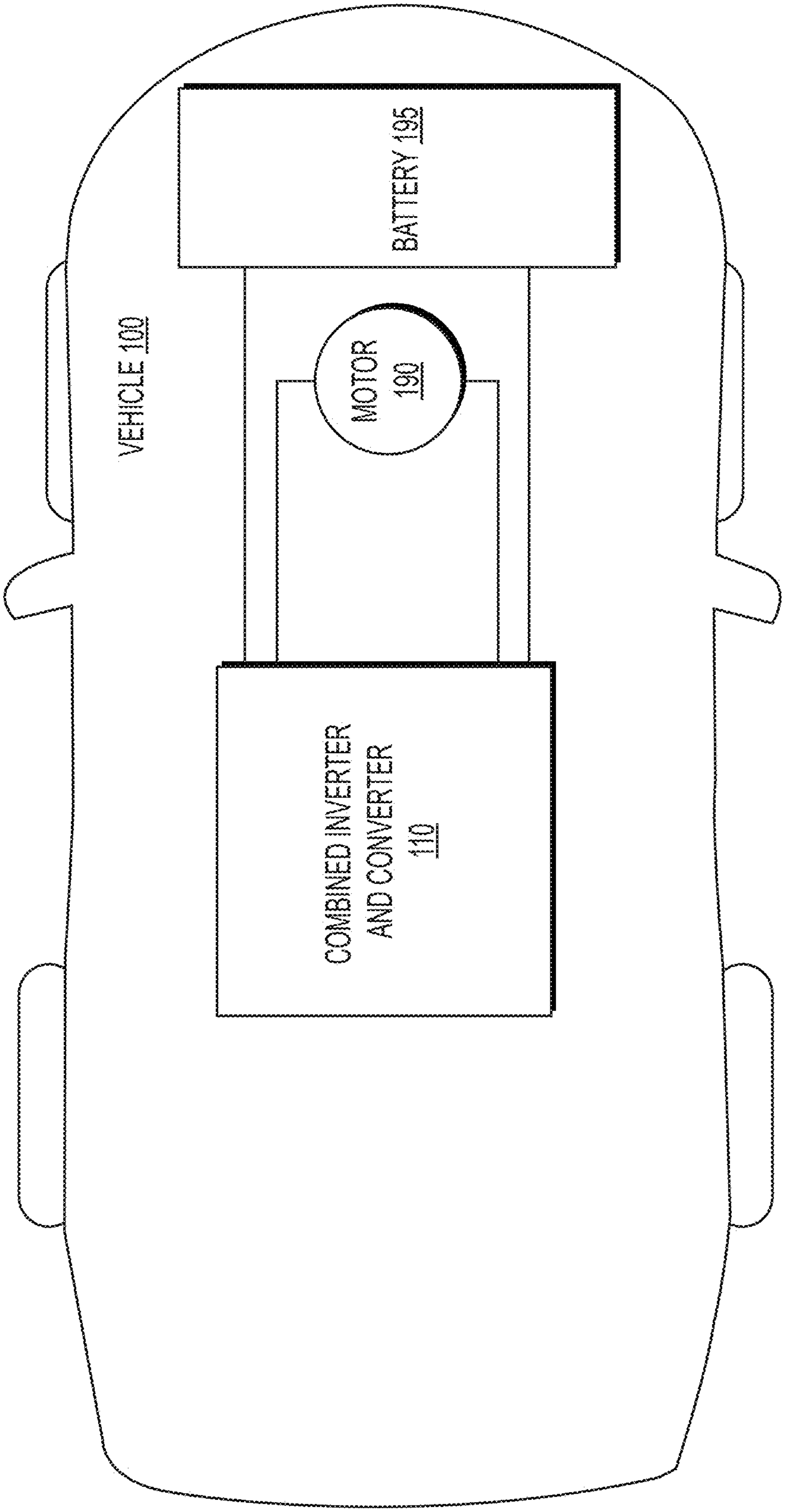
FIG. 1 depicts an exemplary system infrastructure for a vehicle including a combined inverter and converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. For example, in the context of the disclosure, the switching devices may be described as switches or devices, but may refer to any device for controlling the flow of power in an electrical circuit. For example, switches may be metal-oxide-semiconductor field-effect transistors (MOSFETs), bipolar junction transistors (BJTs), insulated-gate bipolar transistors (IGBTs), or relays, for example, or any combination thereof, but are not limited thereto.

Various embodiments of the present disclosure relate generally to systems for an inverter for an electric vehicle, and, more particularly, to systems for an auxiliary battery for an inverter for an electric vehicle.

Inverters, such as those used to drive a motor in an electric vehicle, for example, are responsible for converting HVDC into AC to drive the motor. A three phase inverter may include a bridge with six power device switches (e.g., power transistors such as IGBT or MOSFET) that are controlled by Pulse Width Modulation (PWM) signals generated by a controller. An inverter may include three half-H bridge switches to control the phase voltage, upper and lower gate drivers to control the switches, a PWM controller, and glue logic between the PWM controller and the gate drivers. The PWM controller may generate signals to define the intended states of the system. The gate drivers may send the signals from the PWM controller to the half-H bridge switches. The half-H bridge switches may drive the phase voltage. Six phase (or other phase) inverters and multi-level inverters are not excluded from this concept and will follow similar principles.

As a result of system design, a significant amount of energy may be stored on the HV bus bulk/DC link capacitor of the inverter. This stored HV energy must be dissipated to prevent human exposure to dangerous voltage levels. A function of inverters called "active discharge" allows for the controlled dissipation of the stored energy in the system capacitance. The system capacitance is generally referred to as a bulk capacitor in inverter systems. An HV battery providing energy to the inverter is disconnected prior to initiating active discharge of the bus to avoid discharging the battery. The active discharge function has the ability to quickly dissipate HV bus energy for safety in events such as vehicle service, vehicle crash, and the like. The rate of discharge is a function of initial bus voltage, capacitance, and the energy dissipation mechanism. Government/OEM regulations also dictate what discharge rates are required. For example, regulations may require that an HV bus must be discharged to less than 60V in less than 2.5 seconds.

Inverters frequently have a safety requirement to discharge the bulk capacitor on the inverter, in the event of a crash or other fault situation, in a short period of time, such as between 1 and 3 seconds, for example. Some systems discharge the bulk capacitor using the motor windings, which requires the motor to not be shorted and for the main microcontroller to be available. Some systems discharge the bulk capacitor using a dedicated resistive discharge, which is frequently a combination of high power resistors, a switch, and a controller. Due to safety requirement, discharging the capacitor in an inverter may also be needed when a main microprocessor of the inverter is not available.

Inverters, such as those used to drive a motor in an electric vehicle, may include control and power boards, which may be considered key components of inverters. Control and power boards may be configured to control power conversion for motors with desired speed and torque requirements from users, as well as overall safety of inverters and communication with higher ECUs. To meet electrical safety requirements, it may be necessary (or beneficial) to have basic isolation and/or reinforced isolation between a HV side of an inverter and a LV side of an inverter.

One or more embodiments may include an inverter having an isolation between an HV side, including an HV battery and driver circuits, and control logic circuitry on an LV side for electrical safety reasons. A gate driver circuit on an LV side (e.g., 5V logic) may be supplied by KL30, and an HV side may be supplied by a power supply circuit converting HV voltage from an HV battery to a gate driver supply voltage with functional isolation.

One or more embodiments may include an inverter with an auxiliary battery on an HV side as an auxiliary power supply to a gate driver circuit in case of loss and/or failure of an HV battery, but embodiments are not limited thereto. For example, in case of loss and/or failure of an HV battery, the auxiliary battery on the HV side may also be an auxiliary power supply to other circuit components arranged in the HV side and/or the LV side, and may include systems such as on-board chargers (OBC) or climate compressors, for example. One or more embodiments may include an auxiliary battery with a capacity from approximately 300 mAh to approximately 500 mAh, which may be sufficient for a gate driver circuit secondary side supply, which may be 30 mA for approximately 10 hours safety actuation time. One or more embodiments may include a non-rechargeable auxiliary battery with a health monitoring and protection circuit. One or more embodiments may include a rechargeable battery with a smaller capacity than a non-rechargeable battery, and a charging a protection circuit to charge and protect the rechargeable battery.

FIG. 1 depicts an exemplary system infrastructure for a vehicle including a combined inverter and converter, according to one or more embodiments. Alternatively, the inverter may be an inverter without a converter. In the context of this disclosure, the inverter without a converter, or the combined inverter and converter, may be referred to as an inverter 110. As shown in FIG. 1, electric vehicle 100 may include an inverter 110, a motor 190, and a battery 195. The inverter 110 may include components to receive electrical power from an external source and output electrical power to charge the battery 195 of electric vehicle 100. The inverter 110 may convert DC power from the battery 195 in electric vehicle 100 to AC power, to drive (e.g. rotate) the motor 190 of the electric vehicle 100, for example, but the embodiments are not limited thereto. The inverter 110 may be bidirectional, and may convert DC power to AC power, or convert AC power to DC power, such as during regenerative braking, for example. The inverter 110 may be a three-phase inverter, a single-phase inverter, or a multi-phase inverter.

Figure 2:
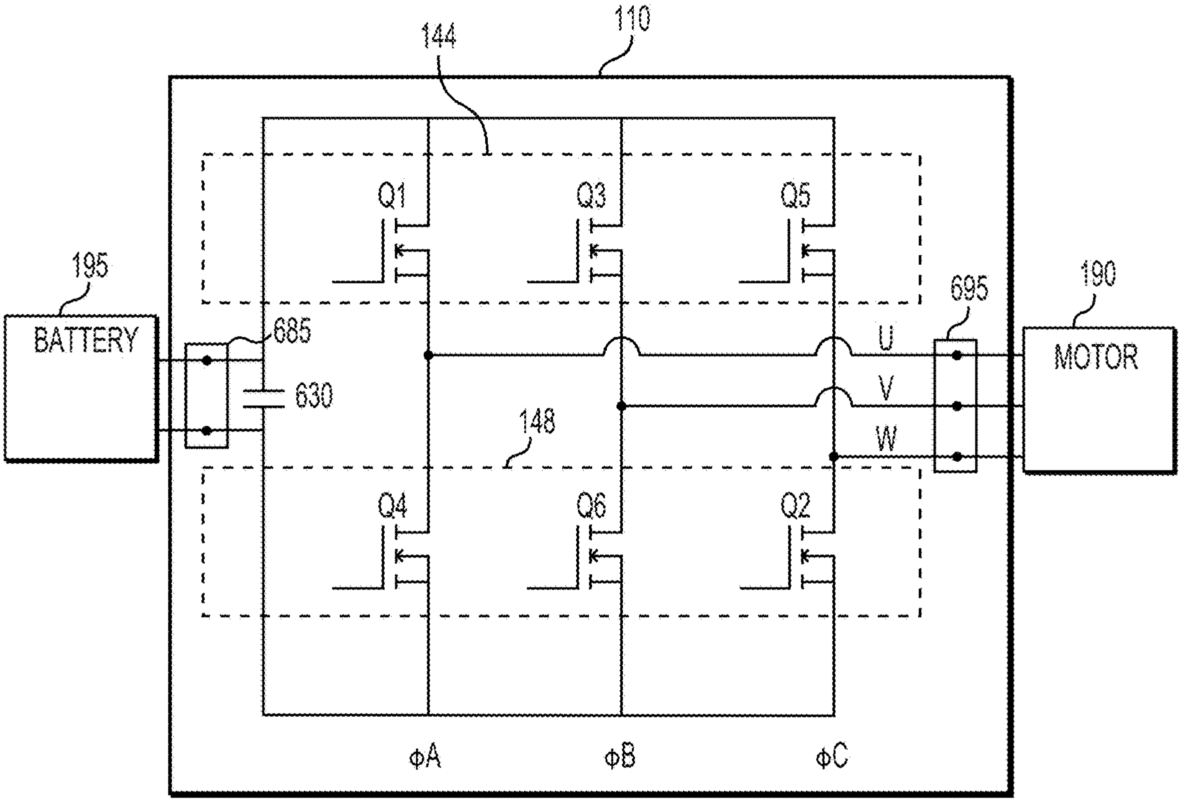
FIG. 2 depicts an electrical power schematic of a three phase inverter module, according to one or more embodiments.

FIG. 2 depicts an electrical power schematic of a three phase inverter module, according to one or more embodiments. As depicted in FIG. 2, inverter 110 may be connected to battery 195 (e.g., DC power supply) and motor 190. Inverter 110 may include upper phase switches 144 and lower phase switches 148. A first phase (ΦA) may include switches Q1 and Q4, a second phase (ΦB) may include switches Q3 and Q6, and a third phase (ΦC) may include switches Q5 and Q2. Upper phase switches 144 may include first phase switch Q1, second phase switch Q3, and third phase switch Q5. Lower phase switches 148 may include first phase switch Q4, second phase switch Q6, and third phase switch Q2. Switches Q1-Q6 may be metal-oxide-semiconductor field-effect transistors (MOSFET), for example, but embodiments are not limited thereto.

Upper phase switches 144 and lower phase switches 148 may be driven by a pulse width modulated (PWM) signal generated by inverter controller 300 (shown in FIG. 3) to convert DC power delivered via the set of input terminals 685 at bulk capacitor 630 to three phase AC power at outputs U, V, and W (correlating with phases A, B, and C, respectively) via the set of output terminals 695 to motor 190. Additionally, although FIG. 2 illustrates a three-phase inverter, the disclosure is not limited thereto, and may include single phase or multi-phase or multi-level inverters.

As a result of system design, a significant amount of HV energy may be stored on the bulk capacitor 630 of the inverter 110. This stored HV energy must be dissipated to prevent human exposure to dangerous voltage levels. A function of inverters called "active discharge" may allow for the controlled dissipation of the stored energy in the bulk capacitor 630. Battery 195 providing energy to the inverter 110 may be disconnected prior to initiating active discharge of the bus to avoid discharging the battery 195. The active discharge function may have the ability to quickly dissipate HV bus energy for safety in events such as vehicle service, vehicle crash, and the like. The rate of discharge may be a function of initial bus voltage, capacitance, and the energy dissipation mechanism. Government/OEM regulations may also dictate what discharge rates are required.

Inverter 110 may have a safety requirement to discharge the bulk capacitor 630 on the inverter 110, in the event of a crash or other fault situation, in a short period of time, such as between 1 and 3 seconds, for example, but embodiments are not limited thereto. Inverter 110 may not discharge the bulk capacitor 630 using windings of motor 190, which requires the motor 190 to not be shorted, and inverter controller 300 to be available. Inverter 110 may discharge the bulk capacitor 630 using a dedicated resistive discharge. For example, inverter 110 may discharge the bulk capacitor 630 using a high power resistor with associated switching and control.

Figure 3:
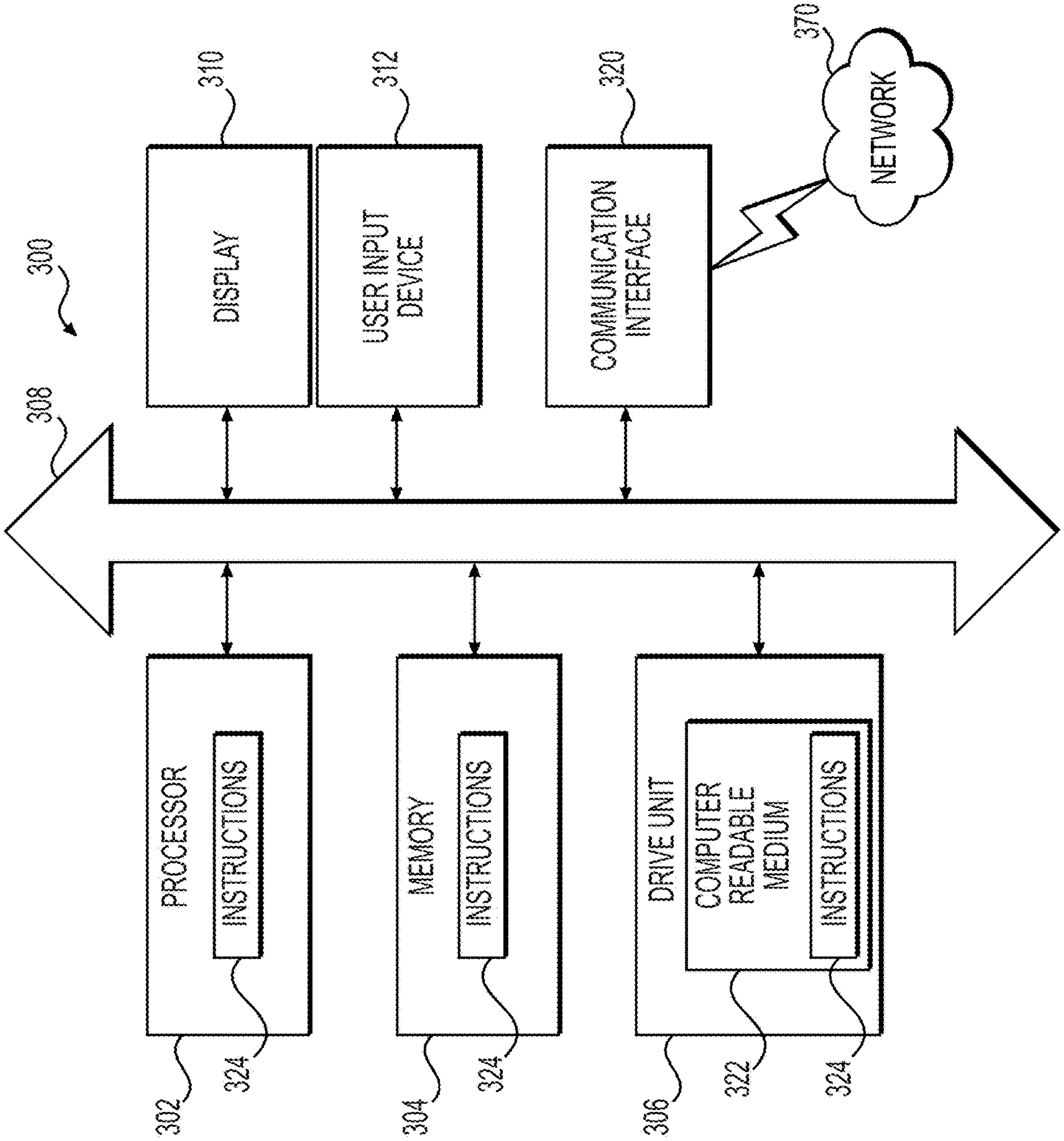
FIG. 3 depicts an exemplary system infrastructure for inverter controller 300 of FIG. 2, according to one or more embodiments.

FIG. 3 depicts an exemplary system infrastructure for the inverter controller 300 of FIG. 2, according to one or more embodiments. The inverter controller 300 may include one or more controllers. The inverter controller 300 may include a set of instructions that can be executed to cause the inverter controller 300 to perform any one or more of the methods or computer based functions disclosed herein. The inverter controller 300 may operate as a standalone device or may be connected, e.g., using a network, to other computer systems or peripheral devices.

In a networked deployment, the inverter controller 300 may operate in the capacity of a server or as a client in a server-client user network environment, or as a peer computer system in a peer-to-peer (or distributed) network environment. The inverter controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the inverter controller 300 can be implemented using electronic devices that provide voice, video, or data communication. Further, while the inverter controller 300 is illustrated as a single system, the term "system" shall also be taken to include any collection of systems or sub-systems that individually or jointly execute a set, or multiple sets, of instructions to perform one or more computer functions.

As depicted in FIG. 3, the inverter controller 300 may include a processor 302, e.g., a central processing unit (CPU), a graphics processing unit (GPU), or both. The processor 302 may be a component in a variety of systems. For example, the processor 302 may be part of a standard inverter. The processor 302 may be one or more general processors, digital signal processors, application specific integrated circuits (ICs), field programmable gate arrays, servers, networks, digital circuits, analog circuits, combinations thereof, or other now known or later developed devices for analyzing and processing data. The processor 302 may implement a software program, such as code generated manually (e.g., programmed).

The inverter controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits (ICs), firm-ware, micro-code and the like, operating alone or in combination. Likewise, processing strategies may include multiprocessing, multitasking, parallel processing and the like.

As shown, the inverter controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the inverter controller 300 may include an input device 312 configured to allow a user to interact with any of the components of the inverter controller 300. The input device 312 may be a number pad, a keyboard, or a cursor control device, such as a mouse, or a joystick, touch screen display, remote control, or any other device operative to interact with the inverter controller 300.

The inverter controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the inverter controller 300. The memory 304 and the processor 302 also may include computer-readable media as discussed above.

In some systems, the computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in inverter controller 300, or combinations thereof. The connection with the network 370 may be a physical connection, such as a wired Ethernet connection or may be established wirelessly as discussed below. Likewise, the additional connections with other components of the inverter controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits (ICs), programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit (IC). Accordingly, the present system encompasses software, firmware, and hardware implementations.

The inverter controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component or object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the operations of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
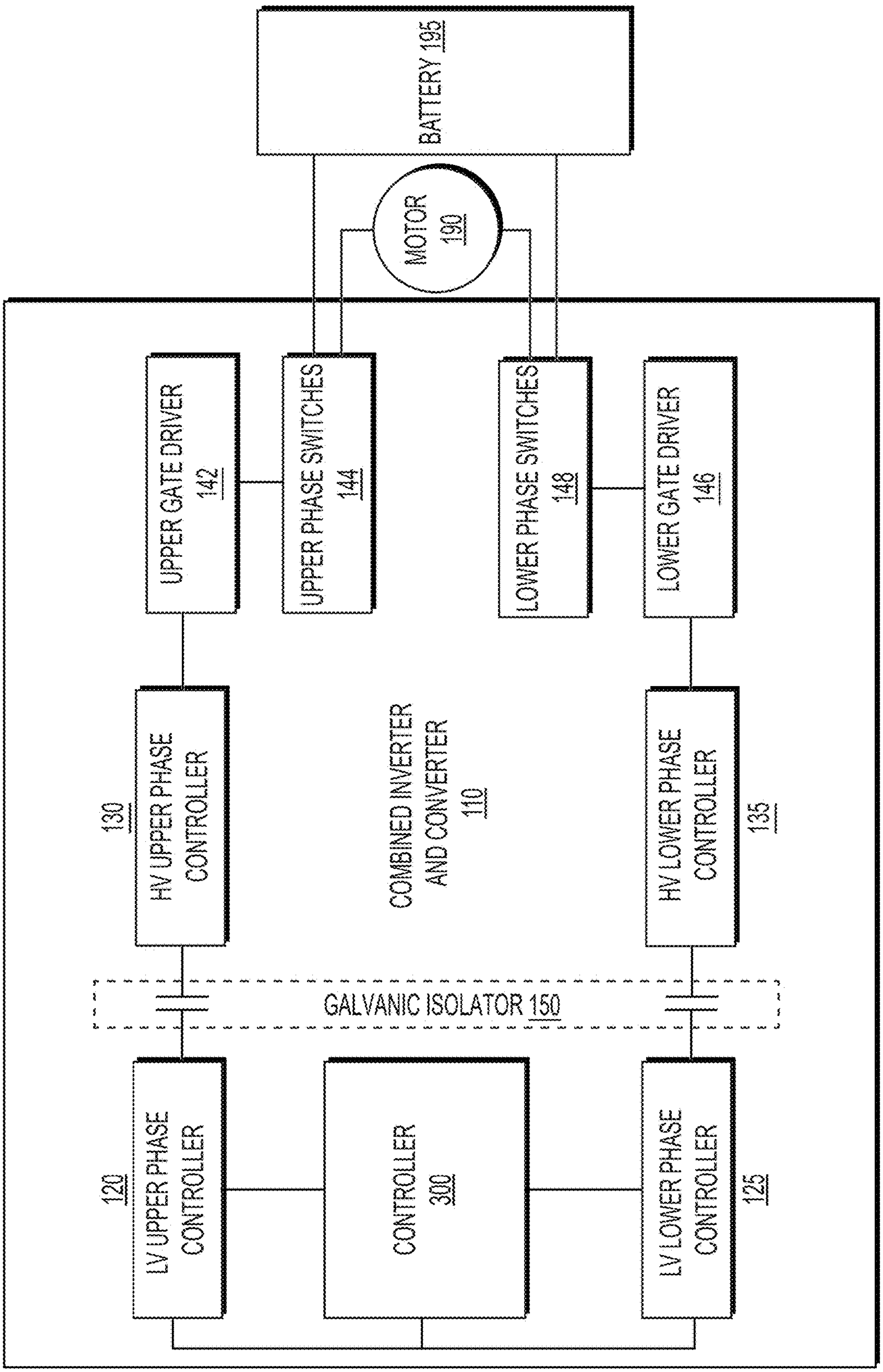
FIG. 4 depicts an exemplary system infrastructure for the combined inverter and converter of FIG. 1, according to one or more embodiments.

FIG. 4 depicts an exemplary system infrastructure for the combined inverter and converter of FIG. 1, according to one or more embodiments. Inverter 110 may include an inverter controller 300 (shown in FIG. 3) to control the inverter 110. Inverter 110 may include an LV upper phase controller 120 separated from an HV upper phase controller 130 by a galvanic isolator 150. Inverter 110 may include an LV lower phase controller 125 separated from an HV lower phase controller 135 by galvanic isolator 150. Inverter 110 may include an HV upper phase controller 130 including a gate driver power supply, an upper gate driver 142, and upper phase switches 144. Inverter 110 may include an HV lower phase controller 135 including a gate driver power supply, a lower gate driver 146, and lower phase switches 148. Upper phase switches 144 and lower phase switches 148 may be connected to motor 190 and battery 195.

Galvanic isolator 150 may be one or more of optical, transformer-based, or capacitance-based isolation, but embodiments are not limited thereto. Galvanic isolator 150 may be one or more capacitors with a value from approximately 20 fF to approximately 100 fF, with a breakdown voltage from approximately 6 kV to approximately 12 kV, for example, but embodiments are not limited thereto. Galvanic isolator 150 may include a pair of capacitors, where one capacitor of the pair carries an inverse data signal from the other capacitor of the pair to create a differential signal for common-mode noise rejection. Galvanic isolator 150 may include more than one capacitor in series. Galvanic isolator 150 may include one capacitor located on a first IC, or may include a first capacitor located on a first IC and a second capacitor located on a second IC that communicates with the first IC.

Inverter 110 may include an LV area, where voltages are generally less than 5V, for example, and an HV area, where voltages may exceed 500V, for example. The LV area may be separated from the HV area by galvanic isolator 150. Inverter controller 300 may be in the LV area of inverter 110, and may send signals to and receive signals from LV upper phase controller 120. LV upper phase controller 120 may be in the LV area of inverter 110, and may send signals to and receive signals from HV upper phase controller 130.

LV upper phase controller 120 may send signals to and receive signals from LV lower phase controller 125. HV upper phase controller 130 may be in the HV area of inverter 110. Accordingly, signals between LV upper phase controller 120 and HV upper phase controller 130 pass through galvanic isolator 150. HV upper phase controller 130 may send signals to and receive signals from the upper gate driver 142. The upper gate driver 142 may send signals to and receive signals from the upper phase switches 144.

Upper phase switches 144 may be connected to motor 190 and battery 195. Upper phase switches 144 and lower phase switches 148 may be used to transfer energy from motor 190 to battery 195, from battery 195 to motor 190, from an external source to battery 195, or from battery 195 to an external source, for example. The lower phase system of inverter 110 may be similar to the upper phase system as described above.

Figure 5:
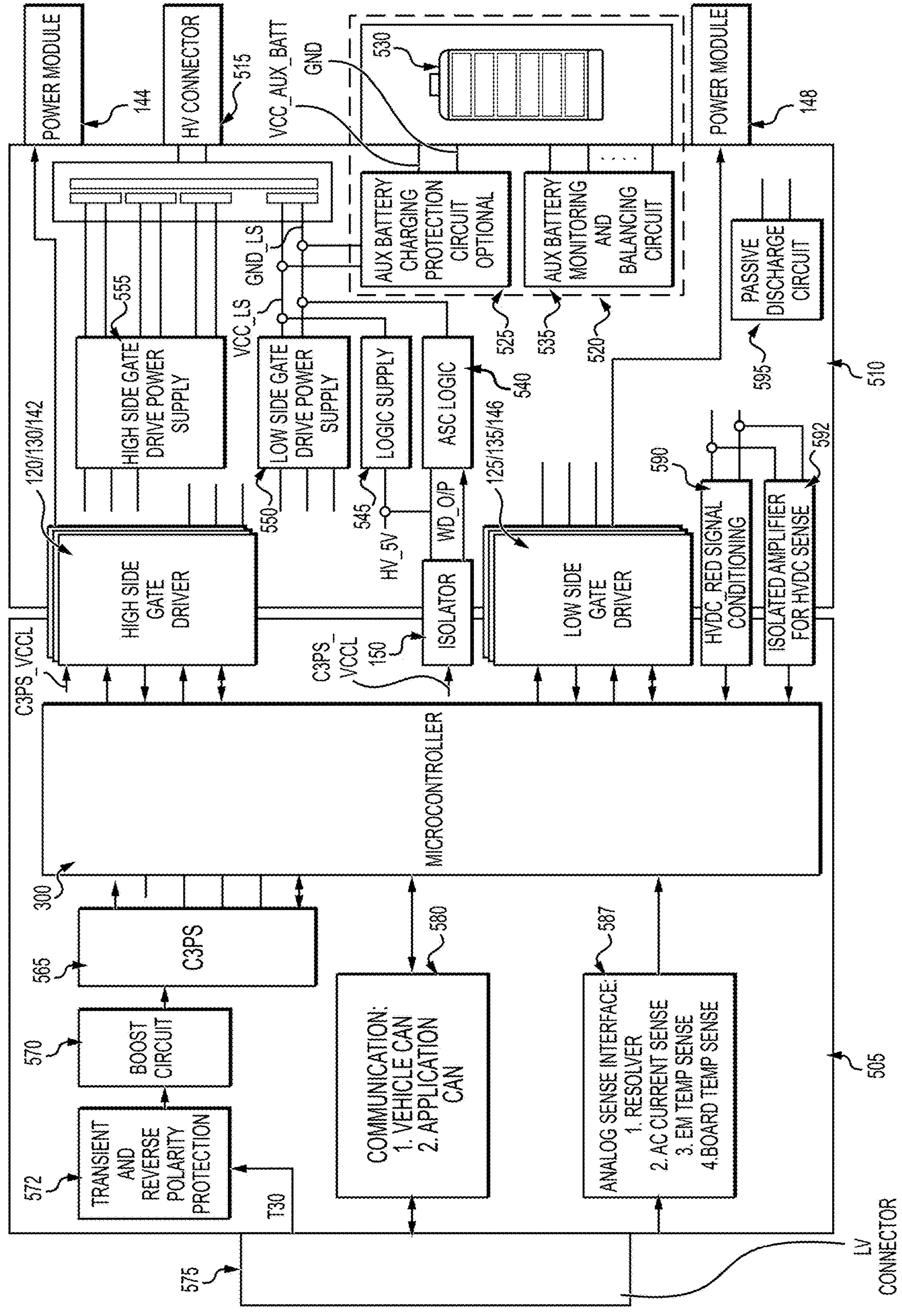
FIG. 5 depicts an exemplary inverter architecture, according to one or more embodiments.

FIG. 5 depicts an exemplary inverter architecture, according to one or more embodiments. The inverter architecture 500 may be an architecture of the inverter 110. The inverter 110 may include an HV side 510 (or HV area), an LV side 505 (or LV area), an HV connector 515, an auxiliary battery assembly 520, the upper phase switches 144, the lower phase switches 148, the galvanic isolator 150, ASC logic 540, a logic supply 545, a low side gate driver power supply 550, a high side gate driver power supply 555, the inverter controller 300 (or microcontroller), a C3PS 565, a boost circuit 570, a transient and reverse polarity protection 572, an LV connector 575, a communication module 580, an analog sense interface 587, an isolated amplifier for HVDC sense 592, an HVDV signal conditioning 590, the low side gate driver 125/135/146, the high side gate driver 120/130/142, and a passive discharge circuit 595.

The auxiliary battery assembly 520 may include an auxiliary charging protection circuit 525, an auxiliary battery monitoring and balancing circuit 535, and an auxiliary battery 530. The inverter controller 300 may be referred to as a microcontroller. The HV side 510 may be referred to as the HV area. The LV side 505 may be referred to as the LV area. The low side gate driver 125/135/146 may correspond to the LV lower phase controller 125, the HV lower phase controller 135, and/or the lower gate driver 146 depicted in FIG. 4. The high side gate driver 120/130/142 may correspond to the LV upper phase controller 120, the HV upper phase controller 130, and/or the upper gate driver 142 depicted in FIG. 4.

The inverter 110 may be configured to provide power from the battery 195 (also referred to as the main battery) (not shown in FIG. 5) to the low side gate driver power supply 550 and the high side gate driver power supply 555. The high side gate driver power supply 555 may be configured to provide power to the high side gate driver 120/130/142. The low side gate driver power supply 550 may be configured to provide power to the low side gate driver 125/135/146. The high side gate driver 120/130/142 may be configured to receive a control signal from the inverter controller 300 to operate the upper phase switches 144.

The low side gate driver 125/135/146 may be configured to receive a control signal from the inverter controller 300 to operate the lower phase switches 148. The high side gate driver power supply 555 and the low side gate driver power supply 550 may be configured to modify (e.g., step-down) an HV received from the battery 195 to provide power to the high side gate driver 120/130/142 and the low side gate driver 125/135/146. The high side gate driver 120/130/142 may be the LV upper phase controller 120, HV upper phase controller 130, and/or the upper gate driver 142, and the low side gate driver 125/135/146 may be the LV lower phase controller 125, the HV lower phase controller 135, and/or the lower gate driver 146.

As depicted in FIG. 5, the inverter controller 300 may be arranged in the LV side 505, such that a control signal provided to the high side gate driver 120/130/142 and the low side gate driver 125/135/146 from the inverter controller 300 may pass through the galvanic isolator 150. The high side gate driver power supply 555 and the low side gate driver power supply 550 may be configured to receive power from the battery 195 during normal operation of the battery 195.

The high side gate driver power supply 555 and the low side gate driver power supply 550 may be configured to receive power from the auxiliary battery 530 during loss and/or failure of the battery 195. The high side gate driver power supply 555 and the low side gate driver power supply 550 may be configured to receive power from the auxiliary battery 530 during initialization of the inverter 110, for example, before the battery 195 is connected to the inverter 110. The high side gate driver power supply 555 and the low side gate driver power supply 550 may be configured to receive power from the auxiliary battery 530 to discharge an HV bus and/or the bulk capacitor 630. The high side gate driver power supply 555 and the low side gate driver power supply 550 may be configured to receive power from the auxiliary battery 530 during shut down of the inverter 110, for example, after the battery 195 is disconnected from the inverter 110.

The auxiliary battery 530 may be a rechargeable battery. The auxiliary charging protection circuit 525 may be configured to charge the auxiliary battery 530 from the battery 195 and/or a separate power source (not shown). The auxiliary battery 530 may be a non-rechargeable battery. The auxiliary battery monitoring and balancing circuit 535 may be configured to monitor the auxiliary battery 530 (e.g., monitor the health of the auxiliary battery 530).

The auxiliary battery assembly 520 may be configured to disconnect the auxiliary battery 530 from the high side gate driver power supply 555 and the low side gate driver power supply 550 when operation of the battery 195 is normal, such that the high side gate driver power supply 555 and the low side gate driver power supply 550 receive power from the battery 195. The auxiliary battery assembly 520 may be configured to connect the auxiliary battery 530 to the high side gate driver power supply 555 and the low side gate driver power supply 550 in response to a failure and/or loss of the battery 195, such that the high side gate driver power supply 555 and the low side gate driver power supply 550 may receive power from the auxiliary battery 530.

According to one or more embodiments, exemplary architectures of inverters may simplify control and gate driver boards, and eliminate a need for basic or reinforced isolation transformers for gate driver power supplies and redundant power supply from HV sides to control logic on LV sides. One or more embodiments may include inverters with a reduction in reinforced or basic isolation components (e.g., reinforced, or basic isolation transformers).

According to one or more embodiments, no power lines (or less power lines) may be crossing an isolation barrier (with an exception for control signals). One or more embodiments may provide a reduction in noise coupling from HV side to LV side, and improvement of EMC behavior. One or more embodiments may provide a reduction in redundant power supply components on LV side control logic. One or more embodiments may provide a reduction in PCB space and costs. One or more embodiments may provide a flexibility in inverter design. One or more embodiments may provide a cost savings in inverter production.

One or more embodiments may include an inverter having an isolation between an HV side, including an HV battery and driver circuits, and control logic circuitry on an LV side for electrical safety reasons. A gate driver circuit on an LV side (e.g., 5V logic) may be supplied by KL30, and an HV side may be supplied by a power supply circuit converting HV voltage from an HV battery to a gate driver supply voltage with functional isolation.

One or more embodiments may include an inverter with an auxiliary battery on an HV side as redundant power supply to a gate driver circuit in case of loss and/or failure of an HV battery, but embodiments are not limited thereto. For example, the auxiliary battery on the HV side may also be a redundant power supply to other circuit components arranged in the HV side and LV side, and may include systems such as on-board chargers (OBC) or climate compressors, for example. One or more embodiments may include an auxiliary battery with a capacity as small as 300 mAh to 500 mAh, which may be sufficient for a gate driver circuit secondary side supply, which may be 30 mA for approximately 10 hours safety actuation time. One or more embodiments may include a non-rechargeable auxiliary battery with a health monitoring and protection circuit. One or more embodiments may include a rechargeable battery with a smaller capacity than a non-rechargeable battery, and a charging a protection circuit to charge and protect the rechargeable battery.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising an inverter configured to convert DC power from a main battery to AC power to drive a motor, wherein the inverter includes:

a galvanic isolator separating a high voltage (HV) area from a low voltage (LV) area;

a gate driver in the HV area, the gate driver to control one or more switches in the HV area in response to a control signal from the LV area;

an auxiliary battery assembly in the HV area; and a power supply to provide power to the HV area from each of the main battery and the auxiliary battery assembly.

2. The system of claim 1, wherein the power supply is a gate driver power supply configured to provide power to the gate driver and receive power from the main battery during normal operation of the main battery.

3. The system of claim 2, wherein the auxiliary battery assembly includes an auxiliary battery, and the auxiliary battery assembly is configured to supply power from the auxiliary battery to circuit components arranged in the HV area in response to a failure of the main battery.

4. The system of claim 3, wherein the auxiliary battery assembly is configured to supply power from the auxiliary battery to the gate driver power supply to discharge an HV bus of the inverter.

5. The system of claim 3, wherein the auxiliary battery assembly further includes one or more of:

an auxiliary battery monitoring and balancing circuit to monitor the auxiliary battery, or an auxiliary battery charging protection circuit to charge the auxiliary battery from the main battery.

6. The system of claim 2, wherein the auxiliary battery assembly includes an auxiliary battery, and the auxiliary battery assembly is configured to supply power from the auxiliary battery to circuit components arranged in the LV area in response to a failure of the main battery.

7. The system of claim 1, wherein the inverter further includes:

one or more controllers arranged in the LV area, the one or more controllers configured to output the control signal.

8. The system of claim 1, wherein the auxiliary battery assembly includes an auxiliary battery, and the auxiliary battery assembly is configured to:

disconnect the auxiliary battery from the power supply when operation of the main battery is normal, and connect the auxiliary battery to the power supply in response to a failure of the main battery.

9. The system of claim 1, further comprising:

the main battery configured to supply the DC power to the inverter; and the motor configured to receive the AC power from the inverter to drive the motor, wherein the system is provided as a vehicle including the inverter, the main battery, and the motor.

* * * * *